Oct. 26, 1954   E. BARTON   2,692,657
PROCESS FOR CONDENSING VAPORIZED PHTHALIC ANHYDRIDE
Filed June 6, 1952
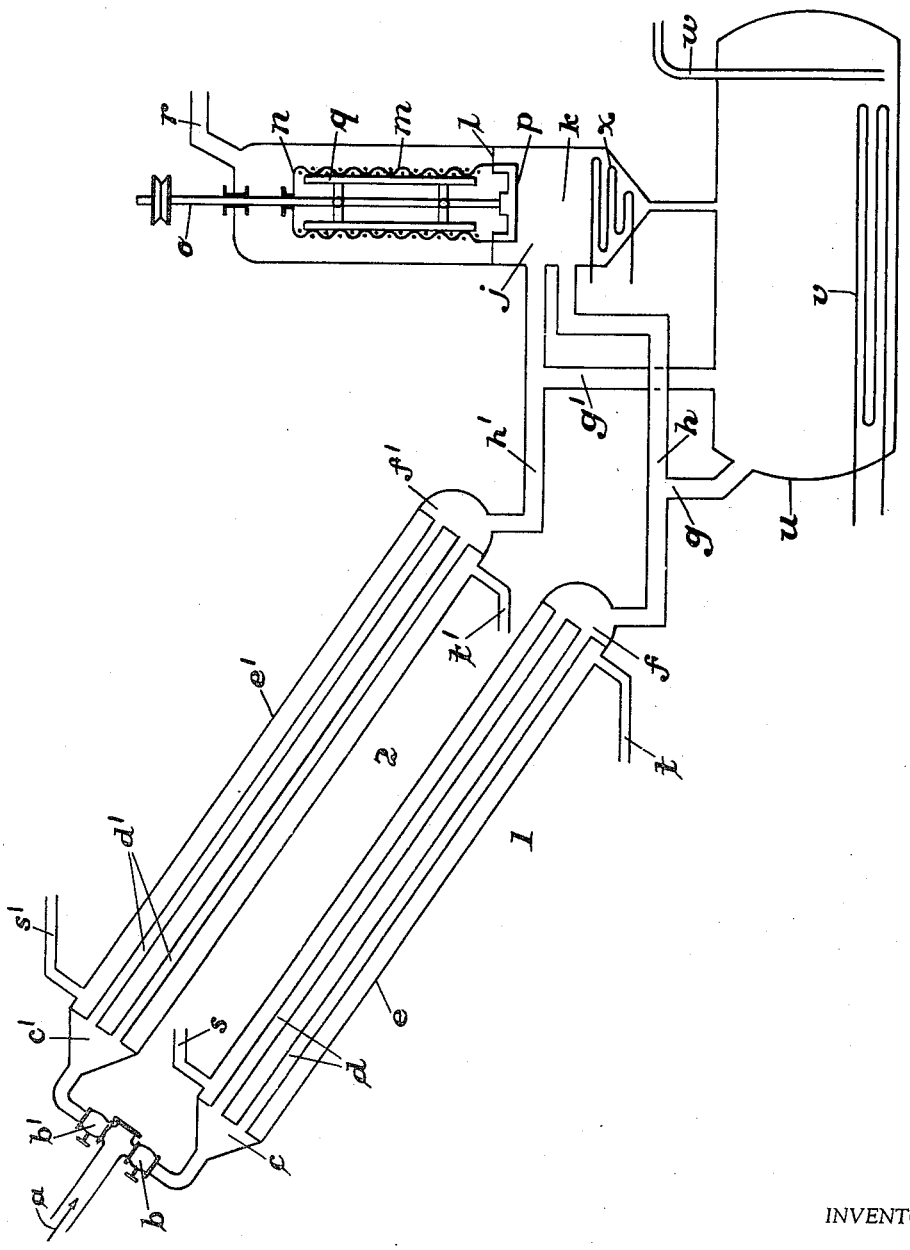
INVENTOR:
Edmund Barton,
BY Cushman, Darby & Cushman
ATTORNEYS.

Patented Oct. 26, 1954

2,692,657

UNITED STATES PATENT OFFICE 2,692,657

PROCESS FOR CONDENSING VAPORIZED PHTHALIC ANHYDRIDE

Edmund Barton, Blackley, England, assignor to Imperial Chemical Industries Limited, a corporation of Great Britain Application June 6, 1952, Serial No. 292,149

4 Claims. (Cl. 183—119)

This invention relates to a process for condensing vaporized phthalic anhydride, and in particular relates to the condensation, on the manufacturing scale, of phthalic anhydride as obtained when the vapor of naphthalene mixed with air (usually in excess) is passed over a solid catalyst as a continuous manufacturing operation.

Various ways are known of carrying out, on the manufacturing scale, the partial oxidation of naphthalene by passing its vapor mixed with air over a catalyst. Be its form as it may, that part of the apparatus employed in which is the catalyst and in which the oxidation takes place is usually known as the converter. As the oxidation proceeds, at a temperature of about 400° C., there issues from the converter a mixture of nitrogen, oxygen not consumed, if any, carbon dioxide, water vapor, phthalic anhydride, and by-products, all together in the form of a hot gas at about or somewhat below 400° C. When this hot gas is cooled to temperatures below 130° C. phthalic anhydride separates in solid form, either in the form of snow, or attached in the form of growing crystalline masses to any cooled solid surface on which the hot gas may impinge. At intermediate temperatures phthalic anhydride may condense in liquid form. If precautions are not taken to control the temperature at which cooling takes place, water vapor also may be condensed, and there may be formation of phthalic acid, which is not desired.

In designing an apparatus wherein phthalic anhydride may be separated on the manufacturing scale, from the hot gas issuing from the converter such are preliminary considerations to be borne in mind, the object being to provide that the phthalic anhydride may be taken out completely and in as pure a state as possible with the minimum of operative steps.

Various forms of condenser have been described. For instance, it has been proposed to pass the stream of hot gas into a series of chambers with externally cooled walls. It has also been proposed to pass the hot gas into vessels containing tubes through which cooling fluid is passed. In such known forms of condensing apparatus the rate of cooling of the gas measured against area of cooling surface is low.

The present invention relates to an improved form of condensing apparatus, proportioned as to dimensions and contrived as to method of operation, to meet the requirements indicated above, and to provide for a high rate of cooling as measured against area of cooling surface, and the invention also comprises the process of condensing phthalic anhydride by use of the said apparatus.

According to the invention a process for the recovery of phthalic anhydride from the hot gases obtained by the catalytic oxidation of naphthalene comprises passing said hot gases, at such a rate as to maintain a state of turbulence therein, through at least one of a plurality of groups of tubes appropriately dimensioned and shaped in relation to the turbulence of the inflow and adapted to be cooled or heated externally, said groups each consisting of at least one tube, applying cooling means to the groups of tubes through which the hot gases are passing and then disconnecting at least one of said groups of tubes from the hot gas feed line, applying heating means to said disconnected groups of tubes and collecting the melted phthalic anhydride from said groups of tubes in a suitable vessel.

More specifically according to the invention phthalic anhydride is condensed from the hot gases obtained as above indicated by use of an apparatus comprising a plurality of what may be called for convenience Liebig condensers or also may be referred to as "shell and tube heat exchangers," and so by a process which comprises passing the hot gas through some but not all of the said Liebig condensers for such a time that the gas flow is not seriously impeded by formation of cake on the inside surface of the condenser tubes and thereafter transferring the flow of hot gas from at least one such Liebig condensed to another not hitherto used, simultaneously with said transfer removing cooling fluid from the shell of the condenser so separated from the gas flow and putting in its place a suitable heating fluid so as to cause the cake to be melted and the so-formed liquid phthalic anhydride to flow out into a suitable receptacle, and continuing thus cyclically.

Thus by a further feature of the invention the process as above described wherein the passage of hot gases from the converter into that group or groups of tubes to which for the time being cooling means are applied is stopped when the cake of condensed phthalic anhydride formed inside the tube or tubes is thick enough to cause such choking as would check outflow of hot gases from the converter, and the flow of hot gases from the converter is immediately diverted to another group or other groups of tubes so that the cooling means and heating means are applied cyclically to the various groups of tubes in such a way that condensation of phthalic anhydride in the apparatus and removal therefrom is continuous as respects outflow from the converter.

In its simplest form the apparatus according to the invention comprises at least one pair of Liebig condensers.

As specified above, the condenser tubes are of particular dimensions.

The condensers are conveniently but not necessarily erected so that they are vertical or slant at not less than about 20° from the horizontal, the aim in such arrangements being to provide for rapid outflow of molten phthalic anhydride in conjunction with convenience of disposition in relation to the converter.

It is as said a feature of the invention that when the hot gas containing the phthalic anhydride in the form of vapor is cooled in a suitable heat-exchanger to a temperature of about 140° to 160° C. and then flows into the condenser tubes its behaviour therein corresponds to Reynolds numbers of about 50,000 to 100,000. That is to say the pipes being for example and for simplicity circular in cross-section (being steel pipes obtainable commercially) the said Reynolds numbers, being those obtainable by calculation, using consistent units (feet, seconds, etc.), are those shown for the range of highly turbulent flow, as indicated for instance on the diagram to be found on page 382 of "Chemical Engineers' Hand-Book," edited by J. H. Perry, 3rd edition, New York, Toronto and London, 1950.

For a given size of converter, operating normally, there is accordingly a predetermined volume of hot phthalic-anhydride-containing gas to be dealt with per unit of time, and the invention is based on an adjustment of cooling by use of pipes appropriately dimensioned as to diameter and length, by proportioning the flow in such pipes to an optimum of cooling obtainable under conditions of turbulent flow, also with allowance for desirable temperatures, pressure losses and minimum losses of product as vapour in exit gases. Thus, with gas and phthalic anhydride leaving the converter in any usual ratio (between 30 to 1 and 7 to 1 by weight) at a rate of about 300 to 650 pounds per hour the temperature of the inflowing gas can be 140° C. to 160° C. as indicated above and that of the exit gas can be from 50° to 80° C., and for such conditions the condenser tubes of the invention (being in this case circular in cross section) have an inside diameter of about 2" or 45–55 mm. and are 60 feet to 80 feet (or about 20 to 25 metres) long.

In the accompanying drawing there is illustrated by way of example an apparatus according to the invention in its simplest form, i. e. comprising a pair of condensers. Referring to said drawing, $a$ is a pipe leading from a cooler which itself is connected to a converter. There enters by the pipe $a$, the direction being shown by an arrow, the still hot gas mixture containing the phthalic anhydride which is to be condensed. Pipe $a$ is bilaterally connected with two valves shown diagrammatically by $b$ and $b'$, of which, in operation according to the process of the invention, one is open when the other is closed. The gas stream then passes into condenser head $c$ or $c'$ as the case may be. It is to be understood that the drawing being diagrammatic the two Liebig condensers each comprising a group of tubes are shown one above the other, whereas in practice they are positioned side by side, and each is shown as having two inner tubes (whereas in practice the number of such tubes may be one or more according to the size of the converter, the diameter of each tube being such as to provide for highly turbulent gas flow, as described). Also it is to be understood that the assemblage is symmetrical in other respects, so that whatever is described in the sequel as relating to leg 2 applies equally to leg 1 although all is not repeated in the drawing.

Proceeding now to describe leg 2, the gas stream passes into the condenser tubes $d'd'$ which are enclosed within the shell or jacket $e'$ and emerges into the tailpiece $f'$ and then into $h'$ which carries pipe $g'$. The lower end of tailpiece $f'$ is connected with a receptacle $u$ for molten phthalic anhydride, said receptacle being suitably provided with heating coil $v$, and pipe $w$ for emptying.

Shells or jackets $ee'$ are provided with pipes $ss'$ at the top and with pipes $tt'$ at the bottom. There may be, for convenience of operation, more of such pipes. When leg 2 is in operation as a condenser water is admitted through pipe $t'$ and overflows from pipe $s'$; when this leg 2 is being emptied of condensate and leg 1 is in operation as a condenser then steam is admitted through pipe $s'$ in this leg 2 (with outflow of condensed steam through pipe $t'$). Suitable valves are provided so that leg 1 and leg 2 operate alternatewise as described (if desired appropriate connections are to be made to render the manipulation of the steam and water valves and of valves $bb'$ automatic or simultaneously controllable).

Most of the phthalic anhydride is condensed, as above described, in the form of cake on the insides of the tubes, but some is condensed as snow in the moving gas, and is accordingly carried along and passed out at the outflow end of the condenser tubes. This may be caught in various ways. It is a further but optional feature of the invention to remove it from the effluent gas by passing the gas through a wire gauze filtering device of a particular design as hereinafter specified.

This optional feature of the invention is likewise shown in the drawing illustratively represented only (as indicated above) as an appendage to leg 2. Branch pipe $h'$ carries the exit gas flow, which bears with it, in the form of snow, some of the phthalic anhydride. This gas passes by inlet $j$ into chamber $k$ (which is or may be provided with a movable bottom, not shown, so that it may be emptied from time to time or there may be conveniently direct discharge into a receptacle provided with a heating coil $x$ and connected with the main receptacle). Chamber $k$ forms the lower part of an upright vessel, being separated from the upper part by annular partition $l$ which is bridged by bearing support and bearing $p$.

Mounted on the inner rim of $l$ is a wire gauze cylinder $m$, the top of which is closed by disc $n$. Finally the exit gases pass to a chimney via pipe $r$. Phthalic anhydride snow is, as will be understood, filtered off by the gauze. Supported by bearing $p$ and by other bearings as shown, is shaft $o$, driven by pulley or cog-wheel, which carries scrapers $q$. These, slowly rotating, keep the bed of snow on the gauze of uniform thickness, and that which is caught drops into chamber $k$.

The gauze is preferably made of "stainless steel" wire, in basket weave, 16 strands to the inch.

In operation, to provide for the cooling described, the cooling fluid (which is conveniently water) in the jackets is kept at 30° to 40° C. This jacket temperature is not so low that water also is condensed as well as phthalic anhydride, and consequently no phthalic acid is formed. As the phthalic anhydride becomes condensed a deposit (cake or lining) is formed on the inside of the tube and the thickness of this cake at any one point increases until the cake becomes so thick that its inner surface is not cool enough to bring about further caking at that point. Thus the tube becomes lined, further and further inwards, more or less uniformly with solid phthalic anhydride. When a stage is reached that condensation along the whole length of the tube becomes inefficient and the flow of gas impeded, then the water in the jacket is removed and replaced by steam (as heating fluid) as above described. For economic working the entire cycle of condensation and melting-out is such that the condensing time for each leg is not less than 30 minutes or so. That is to say, with a 2" tube 70 feet long and an initial exit gas flow of 450 lb. per hour per tube the pressure difference between the two ends of the tube rises in 45 minutes from 1.5 lb. per sq. inch to 3.5 lb. per sq. inch and the temperature of the exit gas has risen at the end of 45 minutes to about 75° C. When or before this stage is reached the deposit is melted out. The melting-out operation, with steam at 165° C. in the jacket takes about 5 minutes from the time the tube reaches the temperature of 165° C. About 20 lb. of phthalic anhydride is then obtained as condensate from one tube of the size indicated, and consequently, for a single condenser of $n$ tubes, the output is $20n$ lbs. per hour, and for a pair such as characterises the invention in its simplest form it is $40n$ lb. per hour. This output figure does not include the phthalic anhydride which is caught as snow in the device described.

What I claim is:

1. A process for the recovery of phthalic anhydride from the hot gases obtained by the catalytic oxidation of naphthalene which have a weight ratio of gas to phthalic anhydride of between 30:1 and 7:1 which comprises passing said hot gases through at least one of a plurality of tubes, the gases entering said tubes at a temperature of between 140° C. and 160° C. and leaving said tubes at a temperature of about 50–80° C., said tubes being cross-sectionally dimensioned in relation to the velocity of the inflowing gases to provide gas flow corresponding to Reynolds Nos. of about 50,000 to 100,000 so that said hot gases while within said tubes are maintained in a state of turbulence, cooling the exteriors of the tubes through which the hot gases are passing to a temperature sufficiently low to effect the aforesaid reduction in temperature and cause the condensation and collection of solid phthalic anhydride on the interior of said tubes, discontinuing the flow of said hot gases to said tubes and then heating the exteriors of said tubes to melt said condensed phthalic anhydride and collecting said melting phthalic anhydride as it emerges from the bottom of said tubes.

2. A process as recited in claim 1 in which the passage of hot gases through said tubes is discontinued when the formation of condensed phthalic anhydride on the interior of said tubes has proceeded to such extent as to cause an undue increase in the pressure differential between the ends of said tube.

3. A process as recited in claim 1 in which the flow of said hot gases which was discontinued with respect to said first tubes is diverted into at least one of the remaining tubes to be cooled and condensed therein, said cooling and said heating being applied cyclically to each group of tubes so that condensation of phthalic anhydride in the tubes and removal of the condensed phthalic anhydride in molten form from the tubes proceeds continuously with respect to the production of said hot gases.

4. A process as recited in claim 1 in which the effluent gases from said tubes pass through a wire gauze which is scraped.

References Cited in the file of this patent

UNITED STATES PATENTS

| Number | Name | Date |
|---|---|---|
| 2,076,033 | Kniskern | Apr. 6, 1937 |
| 2,455,314 | Pietzsch | Nov. 30, 1948 |
| 2,575,876 | Kausch | Nov. 20, 1951 |

FOREIGN PATENTS

| Number | Country | Date |
|---|---|---|
| 8,681 | Great Britain | Oct. 11, 1910 |